Figure 1:
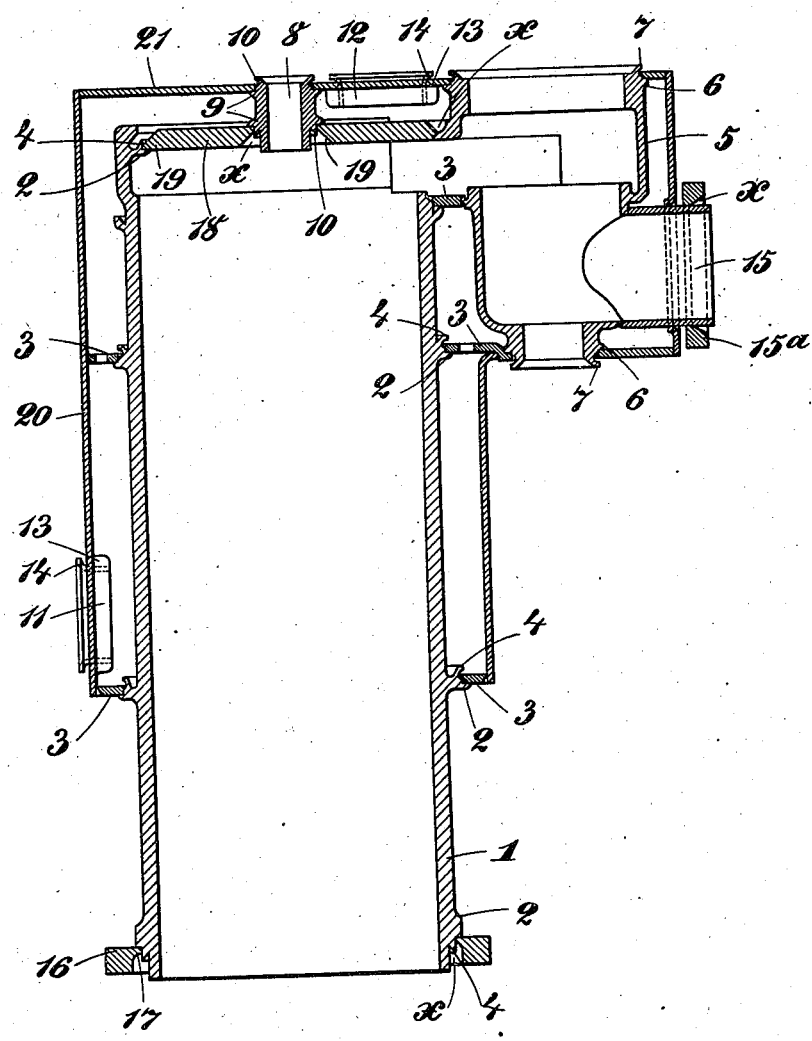

E. JAENISCH.
CONSTRUCTION OF ENGINE CYLINDERS.
APPLICATION FILED FEB. 9, 1914.

1,132,937.

Patented Mar. 23, 1915.
3 SHEETS—SHEET 1.

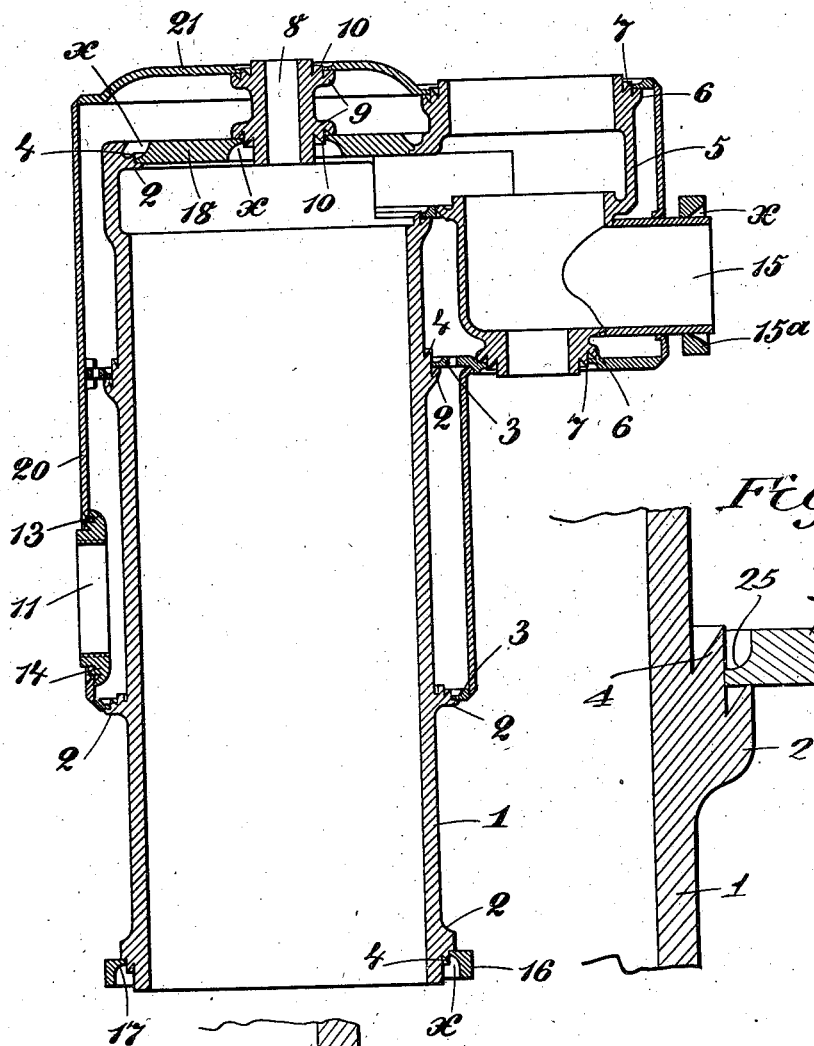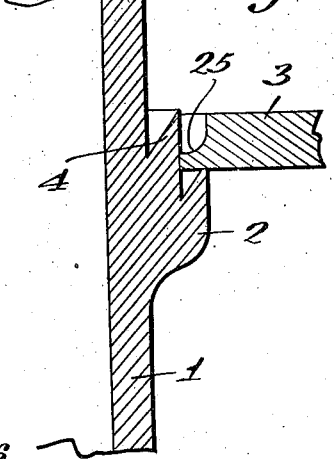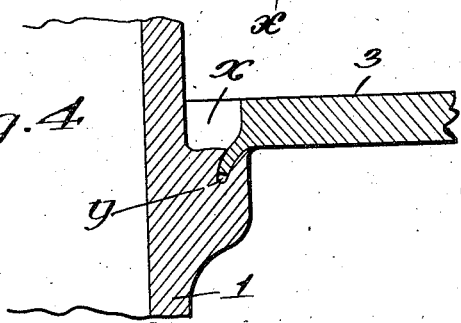

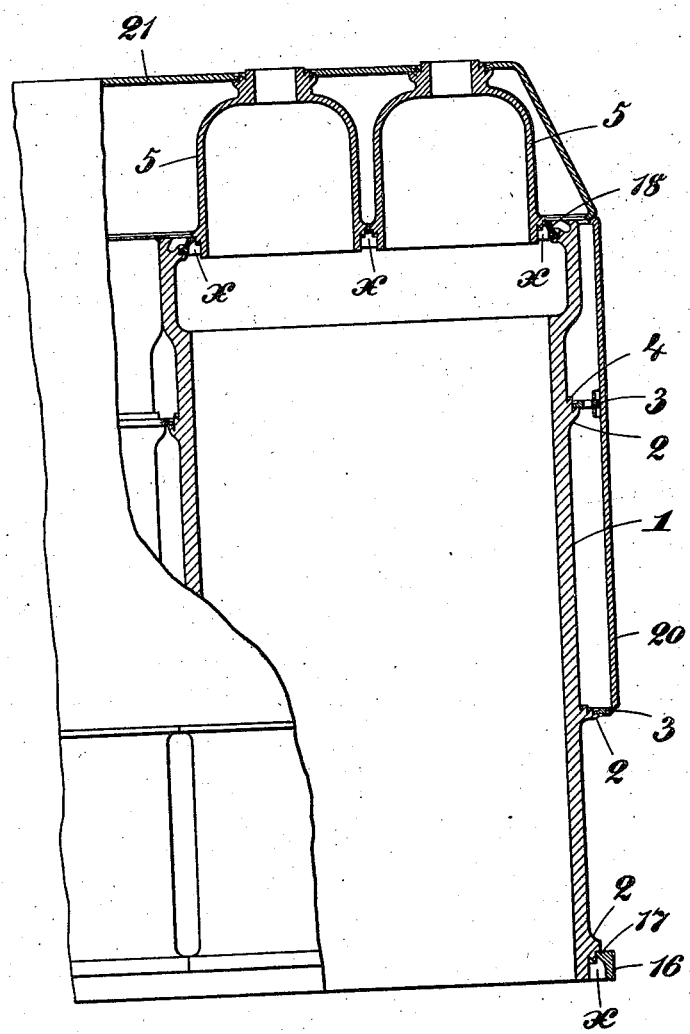

UNITED STATES PATENT OFFICE.

ERNST JAENISCH, OF BERLIN, GERMANY.

CONSTRUCTION OF ENGINE-CYLINDERS.

1,132,937.

Specification of Letters Patent. Patented Mar. 23, 1915.

Application filed February 9, 1914. Serial No. 817,569.

*To all whom it may concern:*

Be it known that I, ERNST JAENISCH, of 16 Zeughofstrasse, Berlin, Kingdom of Prussia, German Empire, a subject of the King of Prussia, and whose post-office address is 16 Zeughofstrasse, Berlin, Kingdom of Prussia, German Empire, have invented new and useful Improvements in or Relating to the Construction of Engine-Cylinders, of which the following is a specification.

The invention relates to the cylinders of engines (internal combustion engines or explosion engines) in which the pockets for the suction and exhaust valves and the cooling water jacket are not cast together, that is to say, formed of cast iron, but in which the cylinder body, the valve pockets and also the socket for the compression tap and the admission and exhaust sockets or parts for the combustible mixture, exhaust gases and cooling water are constituted by separate cylindrical parts of malleable material, steel in particular, which are united to form a whole, one with the other, and with the sheet metal cooling water jacket, by uniting them by autogeneous welding with steel plates or parts which connect these cylindrical elements. Such a combination therefore consists of one, two or more cylindrical bodies each of which is connected with the two corresponding valve pockets and sockets of the kind referred to above as cylindrically turned bodies by means of autogeneous welding in employing a series of plane, plate-shaped bodies whose plane is located perpendicularly to the axis of the cylindrical body. Engine cylinders formed with their accessories in this manner without casting are distinguished by their lightness, the thinness of their walls without any reduction of the strength thereof, uniformity of the compression chambers and efficiency of cooling, as compared with cylinders cast in one piece with their valve pockets and so forth. Their production in large quantities is attended with considerable difficulty, however, in particular as regards obtaining a good and quickly formed weld. As the vertical cylindrical bodies must be welded to the edges of the horizontal connecting plate with a butt joint, it has been found to be extremely difficult in practice to hold the plate-shaped elements in their exact position during the welding operation. If the welding is effected on one edge to one cylindrical body, a distortion and deformation of the connecting plate arises so that it becomes exceedingly difficult to weld it correctly to the other cylindrical body and to insure the production of a good welded joint. On the other hand, it is absolutely necessary not only that the weld should be perfect and reliable in all its parts, but also that all the elements to be united should receive their exact predetermined relative positions, as otherwise failure or interruption in operation will occur owing to the strains to which such engine cylinders are subjected. These difficulties are overcome in accordance with the present invention by forming the cylindrical turned bodies at the places at which they are butt-welded to the connecting plates with turned annular collars, shaped in such a manner that opposite a lower supporting rim a backed-off rivet rim presents itself as the bearing surface for the edge of the plate, that is to be welded to it and which is closed-over or riveted by rolling, hammering, pressing or the like after the plate has been positioned upon the supporting rim, so that prior to welding the plate-shaped parts are firmly clamped on the cylindrical turned parts in their correct position and form, thereby preserving them from deformation or distortion.

The invention also has for its object a special formation of these supporting edges and backed-off edges on the cylindrical part and a special formation of the edges of the plate-shaped uniting elements.

The invention is utilizable both for cases in which each engine cylinder with its valve pockets comprises its own cooling jacket and also for cases in which two or more cylinders and their valve casings are provided with a common jacket.

The invention is also applicable to cases in which the valve pockets are arranged laterally of the cylinder and for cases in which they are arranged above the cylinder cover. The former construction is mainly applicable to the engines of motor road vehicles and the latter for flying machine engines, although both types are used for road motors and for flying machines.

Various embodiments of the invention are illustrated by way of example in the accompanying drawing, in which:

Figure 1 illustrates a construction for a cylinder with lateral valve pockets or casings and is a vertical section centrally through one of the side valve pockets, while the second pocket located behind the first is not visible. Fig. 2 illustrates a modified form of such a cylinder with lateral valve pockets in a similar central vertical section. Both these figures show the combination of the parts after the elements have been fitted together, that is to say, prior to the closing over or riveting and prior to the autogeneous welding. Figs. 3 and 4 are detail sections to a larger scale of a joint in Fig. 2, Fig. 3 showing the connection in the condition represented in Fig. 1, while Fig. 4 shows the connection after the riveting or clamping operation and before welding. Fig. 5 illustrates a constructional form of a two-cylinder arrangement with a common cooling jacket and overhead valve pockets, the section being taken vertically and centrally through a cylinder and a valve pocket.

In Fig. 1, 1 is the cylinder body preferably formed from a thick-walled seamless drawn steel tube by turning on a lathe. As shown, the cylinder body, which is smooth on its inner side and slightly enlarged at its upper part, is furnished with a plurality of annular collars 2 on its outer surface; these collars are stepped and opposite the shoulder present a backed-off rivet edge 4.

5 are the valve pockets, preferably bored from a solid piece of round steel and turned off; of these pockets one only is visible in the drawing (Figs. 1 and 2), the other being behind it. Each valve pocket 5 also comprises stepped outer annular collars 6 provided with a clamping edge 7.

8 is the socket for screwing in the compression tap, and is also advantageously cylindrically formed from a solid steel block with annular collars 9 and clamping edges 10.

11 and 12 are the sockets for admission and discharge of the cooling water; they likewise comprise an annular collar 13 and a clamping edge 14.

15 is the connecting socket for the mixture in the case of the admission valve and for the exhaust gases in the case of the exhaust valve, which in this case is smooth and presents no peculiarity; it is connected with the flange 15$^a$ in the known manner by autogeneous welding.

16 is the bottom flange of the cylinder which on its inner side presents a narrow backed-off rim 17.

3 are the steel connecting plates the lowermost forming the bottom of the water jacket between the cylinder body and the wall of the jacket 20; as shown in the drawing, the next higher plate forms the bottom of the jacket where it surrounds the valve pockets and it also constitutes a stiffening plate between the cylinder body and the walls of the cooling jackets between the valve pockets, while the uppermost plate 3 forms the bottom of the communication passage between the interior of the cylinder and the valve pocket.

18 is the cylinder cover which at the same time forms the top of the communication passage between the cylinder and the valve pockets. It will be noted that the inner edge and the outer edge of the cylinder cover 18 are turned in such a manner that a narrow inner and outer rim 19 exists.

21 is the cover plate of the water jacket.

The parts are so connected that when the plate-shaped part in question, that is to say, one of the sheet steel plates 3, the cylinder cover 18 or the cover 21 of the cooling jacket, is placed upon and fitted to the corresponding annular collar, as a supporting rim (2 or 6 or 9 or 13) the corresponding backed-off clamping edge (4 or 7 or 10 or 14) is riveted over, so that the corresponding plate shaped part is firmly clamped with its edges to be welded between the two cylindrical bodies to be connected by it. The autogeneous welding is then effected in the known manner whereby the closed-over edges (4, 7, 10 or 14) afford good guidance for the welding tool. Where the middle plate 3 bears against the cylinder body no welding is necessary as at this place a water-tight or gas-tight joint is not necessary, the clamping obtained by riveting over the rim 4 being sufficient. The cavities $x$ on the bottom flange, cylinder cover and valve pocket sockets are entirely filled by the welding metal.

Although the constructional form of the connection in accordance with Fig. 1 is generally adequate, the construction illustrated in Figs. 2, 3 and 4 has proved to be particularly advantageous. In this embodiment of the invention the connection between the bottom flange 16 and the cylinder body and also between the cylinder cover 18 and the cylinder body is the same as in Fig. 1, but the formation of the annular collar and of the counter-clamping edge at other places on the cylinder body and on the valve pockets 5, the compression tap socket 8 and the water inlets 11 is modified in the manner shown on an enlarged scale in Fig. 3. The supporting edge 2 and the backed-off clamping edge 4 of the cylinder body 1, the valve pockets 5 and so forth, here present the form in cross-section (as shown in Figs. 2 and 3) of a double tapered shoulder and the edge of the plate 3 to be welded, which rests upon the supporting edge 2 is in the form of a narrow rim 25, which, as shown in Fig. 3, is located over the lower tapered supporting edge 2 prior to the riveting over of the edge 4, the recess being calculated in such a manner that it is deeper than the thin rim 25. With this construction, when the edge 4 is riveted over the thin rims 25 are simultaneously bent downward into the races whereby the plate is clamped with this narrow edge between the supporting edge 2 and the clamping edge 4, so that, as shown in Fig. 4, an annular space $x$ is formed of the same height as the thickness of the plate 3, and this space is completely filled with metal when the autogeneous welding is effected. As already stated, the stepped narrow rim of the plate 3 is shorter than the recess so that, as shown in Fig. 4, a small space $y$ remains even after it has been bent down. This special formation presents the advantage that a large quantity of welding metal is able to penetrate the annular cavity formed at the welding edge as is also the case in the cavities $x$ on the bottom flange and cylinder cover in Fig. 1; a further advantage is that the welding extends deeper than the thickness of the sheet metal plate. The small cavity $y$ provides the favorable effect that during the penetration of the welding metal it prevents premature cooling of the metal. The same advantage of avoiding too speedy cooling during welding is presented both in the construction illustrated in Fig. 1 and in Fig. 2, of the supporting edge 2 and that of clamping edge 4 on the outer edge of the cylinder cover 18, owing to the fact that this edge, as shown in Figs. 1 and 2, forms a projection in the interior of the widened cylinder head and therefore also prevents too speedy cooling during the welding operation.

Fig. 5 merely shows the adaptation of the invention to cylinders with overhead valves, the construction of the bottom flange and cylinder cover being the same as in Figs. 1 and 2, and the connection of the valve pockets is effected in the same manner as in Figs. 2, 3 and 4.

The expression "stepped edges" is intended to cover such forms wherein there is a projecting supporting edge and an adjacent edge which is adapted to be riveted or pressed over so as to engage the part to be secured between these two projecting steps or edges.

What I do claim as my invention, and desire to secure by Letters Patent of the United States, is:—

1. An internal combustion engine comprising a cylinder body, cylindrical valve pockets, water inlet socket and cooling jacket, projecting stepped edges around the cylinder body, and valve pockets, a cylinder cover and connecting plates and flanges between the cylindrical parts to be connected, said plates resting on and held in position by the stepped edges, all of said elements adapted to be welded together at their mutual lines of contact.

2. An internal combustion engine comprising a cylinder, cylindrical valve pockets and water cooling jackets, double stepped edges around the cylinder and valve pockets, a cylinder cover and connecting plates between the cylinder and valve pockets and cylinder and water jackets, reduced edges on the cover and plate engaging over the lower step of each double stepped edge and adapted to be firmly clamped between the two edges when the upper edge is riveted over, all of said elements adapted to be welded together at their mutual lines of contact.

3. An internal combustion engine comprising a cylinder, a widened upper end thereof, an inwardly projecting stepped edge around said widened end, a cylinder cover, a reduced edge thereof supported on the stepped edge of the cylinder and a welded connection between said edges.

In testimony whereof I have hereunto set my hand in presence of two subscribing witnesses.

ERNST JAENISCH.

Witnesses:
 WOLDEMAR HAUPT,
 HENRY HASPER.